United States Patent [19]

Bourquard et al.

[11] Patent Number: 4,686,783
[45] Date of Patent: Aug. 18, 1987

[54] TAG FOR WILD GAME

[75] Inventors: Pierre Bourquard; Yves Bourquard, both of Boecourt, Switzerland

[73] Assignee: Biwi S.A., Switzerland

[21] Appl. No.: 790,322

[22] Filed: Oct. 23, 1985

[30] Foreign Application Priority Data

Feb. 6, 1985 [CH] Switzerland .......................... 531/85

[51] Int. Cl.⁴ .............................................. G09F 3/00
[52] U.S. Cl. .................................... 40/304; 40/21 C;
40/20 R; 40/625; 292/306; 24/16 PB; 24/17 A/P
[58] Field of Search ....................... 40/21 C, 304, 625;
292/307; 24/16 PB, 17 PB

[56] References Cited

U.S. PATENT DOCUMENTS

| | | | |
|---|---|---|---|
| 1,725,926 | 8/1929 | Ker | 40/304 |
| 2,163,016 | 6/1939 | Barker | 40/304 |
| 2,833,064 | 5/1958 | Parker | 40/304 |
| 2,969,570 | 1/1961 | Petri et al. | 24/16 |
| 4,154,011 | 5/1979 | Rakestraw | 40/21 C |
| 4,352,253 | 10/1982 | Oswalt | 40/21 C |

FOREIGN PATENT DOCUMENTS

| | | | |
|---|---|---|---|
| 42195 | 11/1983 | European Pat. Off. | 40/301 P |
| 1131850 | of 0000 | France | 40/302 |
| 2412258 | 6/1979 | France | 40/304 X |
| 2442583 | 6/1980 | France | 40/304 X |
| 1680184 | 12/1953 | Fed. Rep. of Germany | 40/304 X |

Primary Examiner—Gene Mancene
Assistant Examiner—Wenceslao J. Contreras
Attorney, Agent, or Firm—McGlew and Tuttle

[57] ABSTRACT

The two ends of a band of a marking tag for game, defined by male part and female part, are provided with means for permanent attachment to one another by simple pressure. Other means on the perimeter of band permit indication of the date of the tagging using a simple sharp object.

5 Claims, 2 Drawing Figures

TAG FOR WILD GAME

FIELD AND BACKGROUND OF THE INVENTION

The present invention envisages the embodiment of a tag for wild game constituted by a band of elastic material such as plastic whose ends are equipped with complementary means for permanent attachment to one another.

Hunters are required to tag their kills, particularly for statistical census purposes, for control and for identification.

The tags of present day design, most of which are metal, have the major drawback that they can be contravened, that is to say used illegally more than once. Moreover, they are inconvenient to use when it is a matter of showing data such as the place and date of the kill.

Plastic tags have been proposed for wild game and cattle, constituted by two parts designed to be driven into the animal's ear. The first part or male part is formed of a plate on which the required data are supposed to appear and which bears in integral fashion, a pointed stem which is pushed into the ear where it is held in place by the second part or female part forced onto the stem of the male part by means of special pliers. A tag of this kind is the subject of patent NZ No. 162 710/164 351. Here, the drawback resides in the need to use special pliers to fix the two parts of the tag together.

SUMMARY OF THE INVENTION

The invention proposes to obviate the drawbacks mentioned above.

A tag for wild game comprises a resilient band having ends provided with complementary means which are permanently attachable to one another.

A further object of the invention is to provide a band for tagging wild game which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
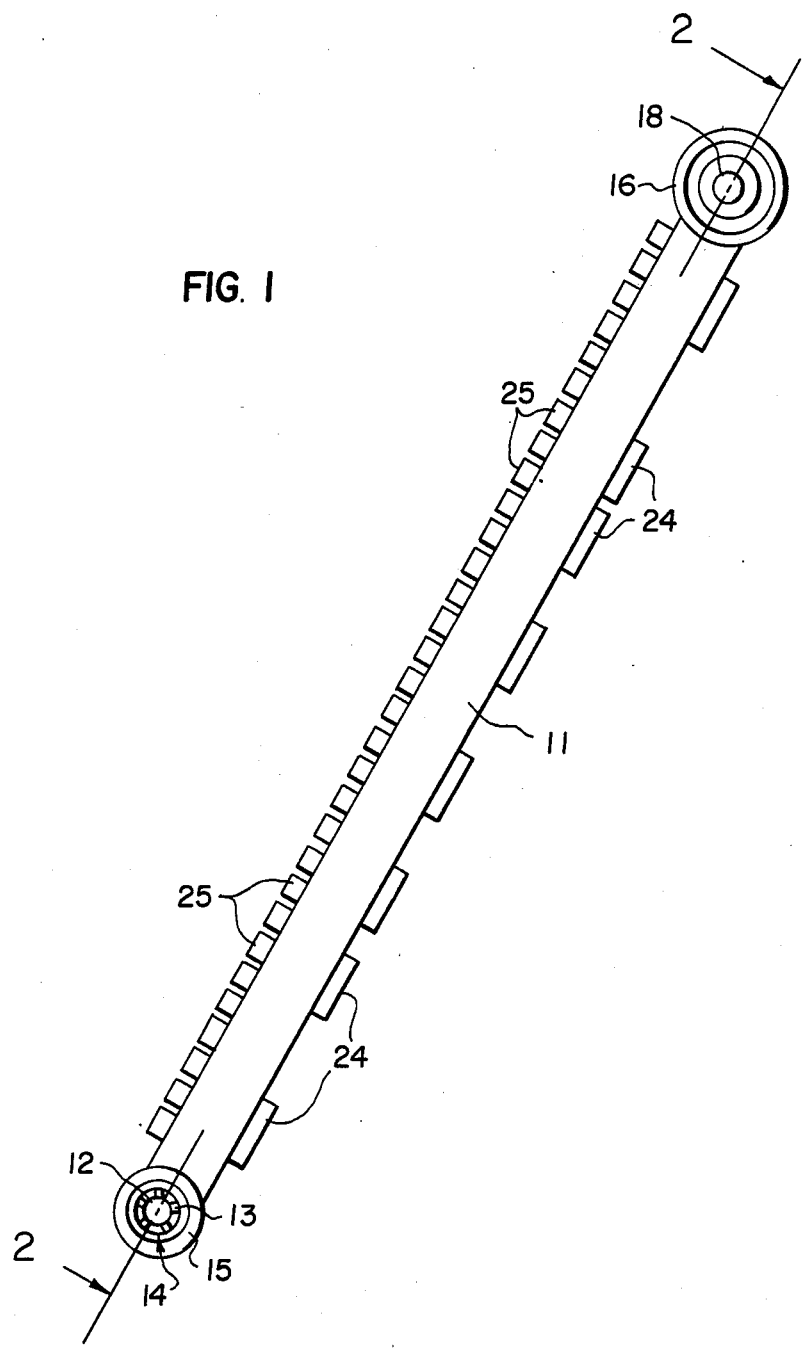
FIG. 1 is a plan view of the internal face of the tag constructed in accordance with the invention.
Figure 2:
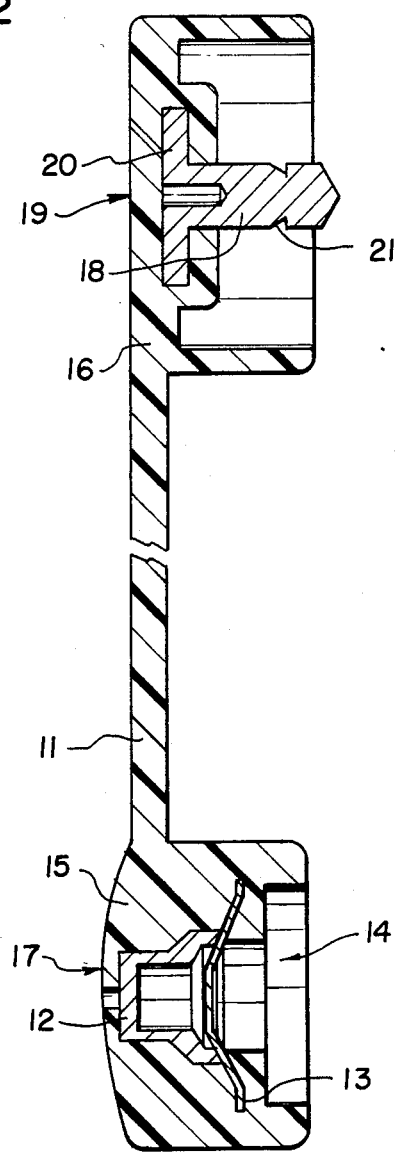
FIG. 2 is a cross section taken along line 2—2 of the tag of FIG. 1.

Referring to the drawings in particular, the invention embodied therein comprises a tag for wild game which comprises a resilient band preferably of a plastic material having ends which are provided with complementary means permitting the ends to be permanently attached to one another. In accordance with the invention the complementary means comprise a female locking part 15 on one end and a male locking part 16 on an opposite end. The male locking part 16 includes a stem 18 which is insertable into an insert or tube 12 of the female part 15. The stem is provided with a locking groove 21 which engages through a collar 13 at the opening of the insert or tube 12 of the female part and becomes locked therewith.

The tag is constituted by a flat band 11 of a resilient material such as plastic on the order of 210 mm long. At one of its ends the band 11 bears, as an integral part, a cylindrical part 15 with an opening 14 whose bottom 17 is lined with a metal insert, or a tube 12 closed on the end facing the bottom 17 and surmounted by a slotted collar 13. This part 15 constitutes a female element or part of the lock.

At its opposite end the band 11 bears, as an integral part, a hollow member 16 with a form complementary to that of part 15, whose bottom 19 encloses the base 20 of a metal insert, or a stem 18 whose perimeter bears a groove 21. This member 16 constitutes the male locking element or part.

The locking of the band is achieved when member 16 caps part 15. This locking is permanent when the stem 18 has penetrated into tube 12, in which it is held by the action of collar 13 in groove 21 around stem 18. A good locking of band 11 therefore implies that the inner diameter of member 16 is close to the outer diameter of part 15, that collar 13 can bend and that its inner diameter before bending is smaller than that of stem 18 and after bending is close to that of stem 18 at the level of groove 21.

Tube 12 is made of brass while stem 18 is made of steel.

The outer face of band 11 can bear fixed markings such as the hunting area (canton, department) the year of the hunt, the name of the animal, and even a serial number.

Tags of different colors can permit easy identification of the animals. And finally, band 11 bears, as integral parts, peripheral means making it possible to indicate the date of tagging, namely on the one hand as many teeth 24 as there are months of open hunting, each of the teeth 24 corresponding to one of these months, and on the other hand 31 teeth 25 corresponding to the days of a month. Preferably, the teeth 24 will bear the name of the months in question and the other teeth 25 are numbered from 1 to 31. To indicate the tagging date, it is only necessary to cut off the teeth 24, 25 corresponding to the day and the month.

The tag according to the invention cannot be contravened, in the sense that, once it is locked, the principal elements that insure the locking (collar 13 and stem 18) are enclosed in the sort of capsule formed by part 15 and member 16.

Just the pressure of the fingers will suffice to lock the tag.

The indication of the tagging date is easy, requiring only a knife or other sharp object.

While the specific embodiment of the invention has been shown and described in detail to illustrate the application of the principles of the invention, it will be understood that the invention may be embodied otherwise without departing from such principles.

What is claimed is:

1. A tag for wild game, comprising a plastic resilient band having ends with complimentary means permanently attachable to one another, said complimentary means comprising on one end of said band and as an integral part thereof, a cylindrical female locking part, said female part being provided with an opening having a cylindrical bottom, a cylindrical metal insert in said bottom having an opening therein, a collar secured to said female locking part and having an inner portion overlying said insert, and on the other end of said band, and as an integral part thereof, a hollow element of a form complimentary to said cylindrical female locking part, said cylindrical female locking part being insertable into said hollow element and closely fitted within said hollow element, said hollow element having a bottom portion, and a metal male locking stem having a large diameter base embedded in said bottom portion of said hollow element and having a smaller diameter stem portion projecting upwardly from said base portion of said hollow element, said stem portion having a groove extending around its periphery, said stem portion penetrating into said insert and engaging said collar in the groove of said stem portion for retaining said hollow element to said female locking part.

2. A tag according to claim 1, wherein said band has as integral parts thereof peripheral means for indicating the date of tagging, said peripheral means including teeth designating months.

3. A tag according to claim 2, whrein in addition to the teeth designating months there are 31 other indicating elements.

4. A tag according to claim 2, wherein said teeth are marked with months including other teeth numbered from one to 31.

5. A tag according to claim 1 wherein said band has opposite edges extending between said female locking part and said hollow element, 31 spaced apart teeth made as one part with said band and extending from one of said edges of said band, each of said teeth carrying a number from 1 through 31, and a plurality of teeth made as one part with said band spaced along and projecting from the opposite edge of said band each carrying an indication of a different month, one of said 31 teeth being severable from said band to indicate a day of the month and one of said plurality of teeth being severable from said band to indicate a month.

* * * * *